(12) United States Patent
Hong et al.

(10) Patent No.: US 12,289,025 B2
(45) Date of Patent: Apr. 29, 2025

(54) MOTOR

(71) Applicant: LG INNOTEK CO., LTD., Seoul (KR)

(72) Inventors: Hoon Ki Hong, Seoul (KR); Bong Geong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 247 days.

(21) Appl. No.: 18/033,109

(22) PCT Filed: Oct. 21, 2021

(86) PCT No.: PCT/KR2021/014773
§ 371 (c)(1),
(2) Date: Apr. 21, 2023

(87) PCT Pub. No.: WO2022/086199
PCT Pub. Date: Apr. 28, 2022

(65) Prior Publication Data
US 2023/0396117 A1    Dec. 7, 2023

(30) Foreign Application Priority Data

Oct. 22, 2020 (KR) .................. 10-2020-0137308
Oct. 26, 2020 (KR) .................. 10-2020-0139335

(51) Int. Cl.
*H02K 3/34* (2006.01)
*H02K 3/52* (2006.01)
*H02K 5/22* (2006.01)

(52) U.S. Cl.
CPC ............. *H02K 3/345* (2013.01); *H02K 3/522* (2013.01); *H02K 5/225* (2013.01); *H02K 2203/09* (2013.01)

(58) Field of Classification Search
CPC .... F04C 15/00; H02K 3/522; H02K 2203/09; H02K 5/225; H02K 5/22; H02K 3/345;
(Continued)

(56) References Cited

U.S. PATENT DOCUMENTS

| | | |
|---|---|---|
| 7,595,572 B2 | 9/2009 | Haga et al. |
| 2010/0207467 A1 | 8/2010 | Urano et al. |

(Continued)

FOREIGN PATENT DOCUMENTS

| | | | |
|---|---|---|---|
| JP | 2007-325481 A | 12/2007 | |
| JP | 2009-100626 A | 5/2009 | |

(Continued)

OTHER PUBLICATIONS

International Search Report (with English Translation) and Written Opinion dated Jan. 5, 2022 issued in Application No. PCT/KR2021/014773.

*Primary Examiner* — Alexander A Singh
(74) *Attorney, Agent, or Firm* — KED & ASSOCIATES, LLP

(57) ABSTRACT

The present invention may provide a motor including a shaft, a rotor coupled to the shaft, and a stator disposed to correspond to the rotor, wherein the stator includes a stator core, an insulator coupled to the stator core, and a coil disposed on the insulator, the coil is electrically connected to a busbar, the busbar is supported by a busbar holder, the insulator includes a first spherical surface, the busbar holder includes a second spherical surface in contact with the first spherical surface, and the first spherical surface and the second spherical surface are disposed in an overlapping region of the insulator and the busbar holder in a radial direction.

10 Claims, 22 Drawing Sheets

(58) Field of Classification Search
CPC .. H02K 3/34; H02K 5/15; H02K 5/16; H02K 3/50; H02K 5/04; H02K 5/161
USPC .......................................... 310/214, 215, 71
See application file for complete search history.

(56) References Cited

U.S. PATENT DOCUMENTS

2017/0310193 A1* 10/2017 Ryu ..................... H02K 3/50
2021/0305875 A1* 9/2021 Takahashi ............. H02K 15/14

FOREIGN PATENT DOCUMENTS

| KR | 10-2020-0049156 A | 5/2020 |
| KR | 10-2020-0063731 A | 6/2020 |
| KR | 10-2020-0087474 A | 7/2020 |

* cited by examiner

MOTOR

CROSS-REFERENCE TO RELATED PATENT APPLICATIONS

This application is a U.S. National Stage Application under 35 U.S.C. § 371 of PCT Application No. PCT/KR2021/014773, filed, which claims priority to Korean Patent Application Nos. 10-2020-0137308, filed Oct. 22, 2020, and 10-2020-0139335, filed Oct. 26, 2020, whose entire disclosures are hereby incorporated by reference.

TECHNICAL FIELD

The present invention relates to a motor.

BACKGROUND ART

A motor includes a rotor and a stator. The stator may include a stator core, an insulator mounted on the stator core, and a coil wound around the insulator.

A connecting end of the coil may be connected to a busbar. The busbar is supported by a busbar holder. The busbar holder may be disposed at one side of the stator.

In order to fix the busbar and prevent vibrations of the busbar, the busbar holder may be in contact with the insulator. For example, a protrusion may be formed on a lower surface of the busbar holder, and a groove may be formed in an upper end of an inner guide of the insulator so that the busbar holder may be fixed to the stator using a coupling structure using the groove and the protrusion.

However, a fixing structure of the busbar holder and the insulator is a structure in which the busbar holder is disposed on the insulator in an axial direction and a gap is inevitably generated between the busbar holder and the insulator in the axial direction, a radial direction, a circumferential direction, and the like, and thus there is a problem that vibrations may occur.

In addition, there is a problem that a bad connection between the stator coil and the busbar occurs due to axial vibrations.

DISCLOSURE

Technical Problem

Accordingly, the present invention is intended to address the above problems and directed to providing a motor in which generation of a gap in a fixing structure of a busbar holder and an insulator is reduced.

In addition, the present invention is directed to providing a motor in which a bad connection between a stator and a busbar due to axial vibrations is prevented by increasing a fixing force between the stator and the busbar.

Objectives to be achieved by the present invention are not limited to the above-described objectives, and other objectives which are not described above will be clearly understood by those skilled in the art through the following descriptions.

Technical Solution

One aspect of the present invention provides a motor including a shaft, a rotor coupled to the shaft, and a stator disposed to correspond to the rotor, wherein the stator includes a stator core, an insulator coupled to the stator core, and a coil disposed on the insulator, the coil is electrically connected to a busbar, the busbar is supported by a busbar holder, the insulator includes a first spherical surface, the busbar holder includes a second spherical surface in contact with the first spherical surface, and the first spherical surface and the second spherical surface are disposed in an overlapping region of the insulator and the busbar holder in a radial direction.

Any one of the first spherical surface and the second spherical surface may be a convex spherical surface, and the other one may be a concave spherical surface.

The first spherical surface may be disposed on a guide of the insulator, and the second spherical surface may be disposed on an inner surface of an extension of the busbar holder.

A radius of the first spherical surface and a radius of the second spherical surface may be smaller than a radial thickness of the guide.

The extension may include a protrusion, the guide may include a first groove, the first spherical surface may be disposed on the protrusion, and the second spherical surface may be disposed in the first groove.

Another aspect of the present invention provides a motor including a shaft, a rotor coupled to the shaft, and a stator disposed to correspond to the rotor, wherein the stator includes a stator core, an insulator coupled to the stator core, and a coil disposed on the insulator, the coil is electrically connected to a busbar, the busbar is supported by a busbar holder, the insulator includes a guide including a first surface, the busbar holder includes an extension including a second surface in contact with the first surface, the guide includes a first groove disposed in the first surface, the extension includes a protrusion disposed on the second surface, and the protrusion and the first groove form a contact region having a curved shape.

The guide may include a second groove which connects an edge of the guide and the first groove.

A circumferential maximum length of the first groove may be greater than a circumferential maximum length of the second groove, and a radial maximum length of the first groove may be greater than a radial maximum length of the second groove.

The circumferential maximum length of the first groove may be smaller than a radial thickness of the guide.

The extension may include a chamfer portion disposed at a lower portion of the extension.

Still another aspect of the present invention provides a motor including a shaft, a rotor coupled to the shaft, a stator disposed to correspond to the rotor, and a bearing which supports the shaft, wherein the stator includes a stator core, an insulator coupled to the stator core, and a coil disposed on the insulator, the coil is electrically connected to a busbar, the busbar is supported by a busbar holder, the busbar holder includes a first part in which the busbar is disposed, a second part which supports the bearing, and at least one third part extending from the first part toward the stator, the third part includes a protrusion protruding in a radial direction, and the insulator includes a stepped portion with which the protrusion is in contact.

The motor may include a housing which accommodates the stator, wherein the first part may be coupled to the housing.

The second part may be disposed further inward than the stator, and the third part may be disposed further outward than the stator.

The third part may be disposed to be spaced a first distance from an outer edge of the first part, the third part may be disposed to be spaced a second distance from the second part, and the second distance may be greater than the first distance.

The first part may include at least one hole formed inward from the third part.

The motor may include a first terminal disposed between the busbar and the stator, wherein the first terminal may be electrically connected to the coil, and the busbar may include a first end portion in contact with the first terminal.

The third part may include a 3A part and a 3B part spaced apart from the 3A part in a circumferential direction, and at least one first end portion may be disposed between the 3A part and the 3B part.

The third part may include a leg portion which connects the first part and the protrusion, and a radial width of the leg portion may decrease toward the protrusion.

The leg portion may include a first surface disposed to face inward and a second surface disposed to face outward, wherein the first surface may form a first angle with respect to one surface of the first part, the second surface may form a second angle with respect to one surface of the first part, and the first angle and the second angle may be different.

A ratio of a minimum width to a maximum width of the leg portion may be in the range of 0.4 to 0.6.

Advantageous Effects

According to an embodiment, an advantageous effect of preventing generation of a gap in any direction in a fixing structure of a busbar holder and an insulator is provided.

According to an embodiment, an advantageous effect of preventing foreign matters from being introduced between a busbar holder and an insulator because there is no gap between the busbar holder and the insulator is provided.

According to an embodiment, an advantageous effect of facilitating switching and correction of a fixing direction in a fixing process of a busbar holder and an insulator is provided.

According to an embodiment, a bad connection of a stator and a busbar due to axial vibrations can be prevented by improving an axial fixing force between a busbar holder and the stator.

In particular, a phenomenon in which a busbar is separated from a stator can be prevented by generating a stress of a wave washer which supports a bearing in an axial direction.

MODES OF THE INVENTION

Figure 1:
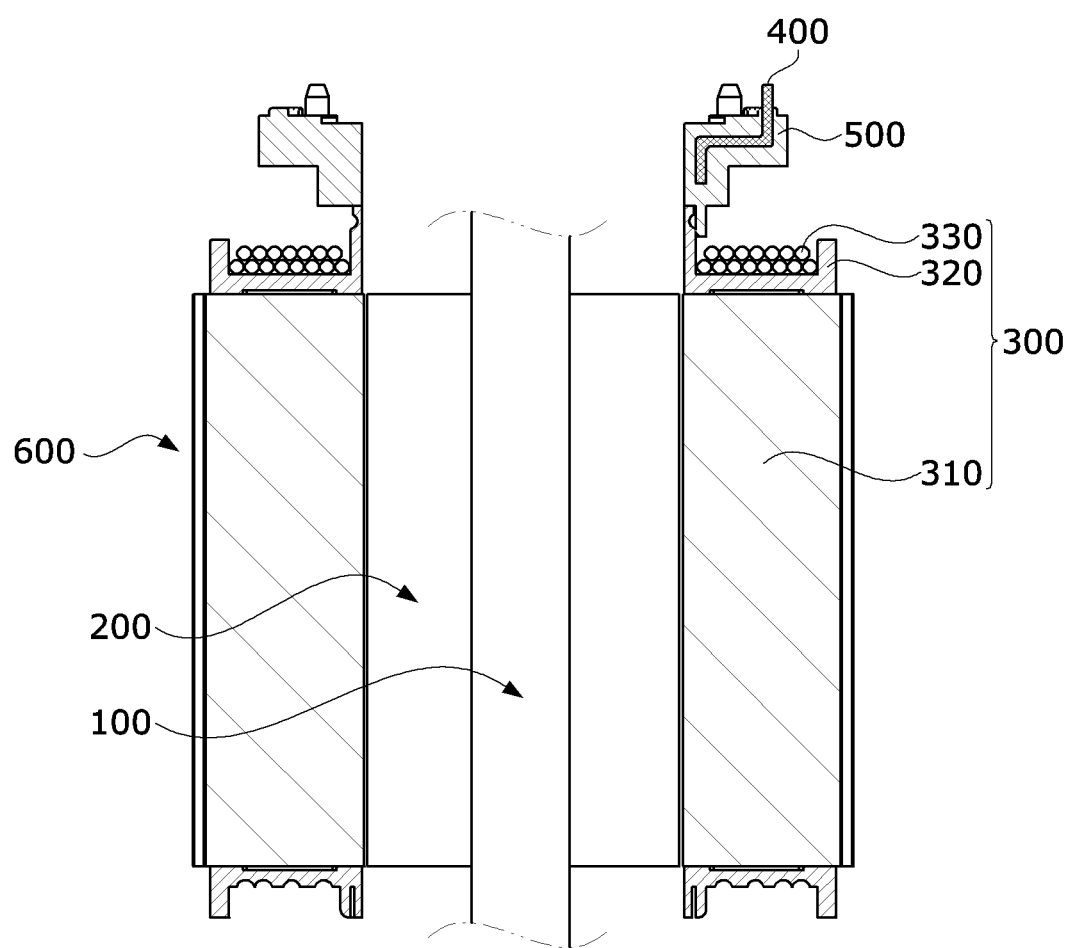
FIG. 1 is a view illustrating a motor according to an embodiment.

Referring to FIG. 1, a motor according to an embodiment may include a shaft 100, a rotor 200, a stator 300, a busbar 400, a busbar holder 500, and a housing 600. Hereinafter, the term "inward" refers to a direction from the housing 600 toward the shaft 100 which is a center of the motor, and the term "outward" refers to a direction opposite to "inward," that is, a direction from the shaft 100 toward the housing 600.

The shaft 100 may be coupled to the rotor 200. When an electromagnetic interaction occurs between the rotor 200 and the stator 300 by supplying a current, the rotor 200 rotates, and the shaft 100 rotates in conjunction with the rotor 200. The shaft 100 may be rotatably supported by a bearing.

The rotor 200 rotates due to an electrical interaction with the stator 300. The rotor 200 may be disposed to correspond to the stator 300 and may be disposed inside the stator 300. The rotor 200 may include a rotor core and a magnet disposed on the rotor core. In this case, the rotor 200 may be a surface permanent magnet (SPM) type rotor in which a magnet is disposed on an outer circumferential surface of a rotor core or an inner permanent magnet (IPM) type rotor in which a magnet is disposed inside a core of a rotor 200.

The stator 300 is disposed outside the rotor 200. The stator 300 may include a stator core 310, an insulator 320, and a coil 330. The coil 330 may be wound around the insulator 320. The insulator 320 is disposed between the coil 330 and the stator core 310 to electrically insulate the stator core 310 from the coil 330. The coil 330 induces an electrical interaction with the magnet of the rotor 200.

The busbar 400 may be disposed above the stator 300. The busbar 400 is electrically connected to the coil 330. In addition, the busbar 400 may be connected to an external power source. Three busbars 400 connected to a power supply having a U-phase, a V-phase, and a W-phase may be provided.

The busbar holder 500 supports the busbar 400. The busbar holder 500 may be an annular member including the busbar 400 therein.

Figure 2:
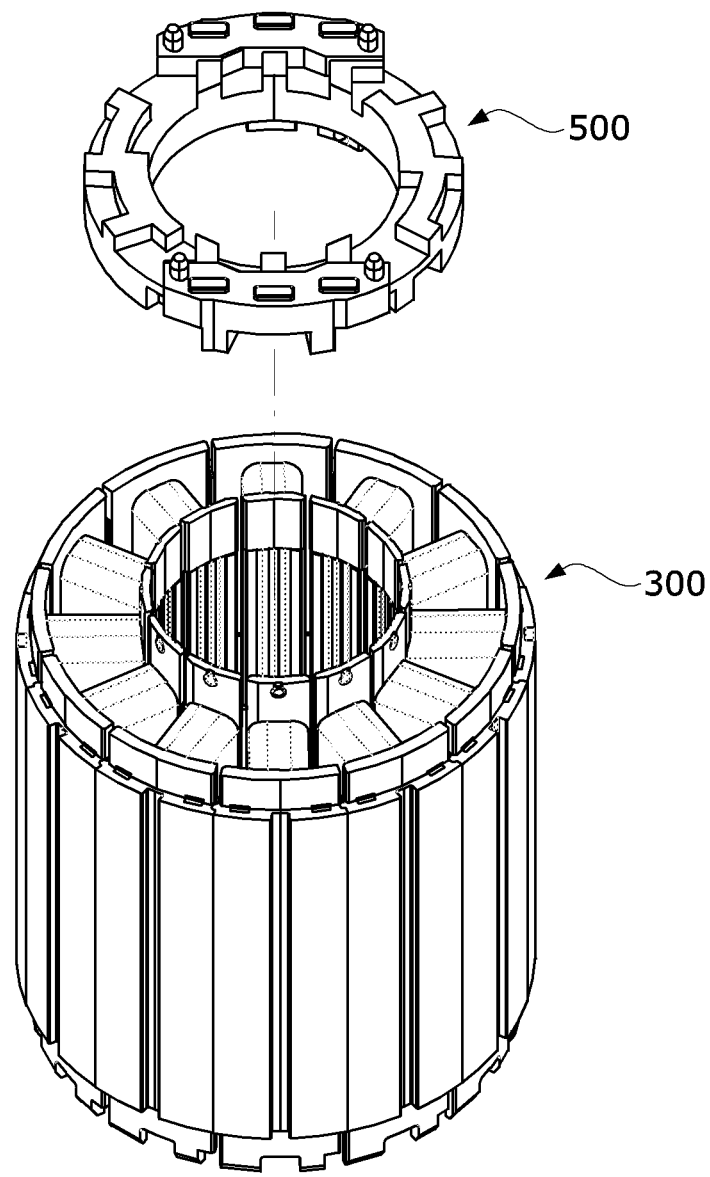
FIG. 2 is a perspective view illustrating a busbar holder and a stator.
Figure 3:
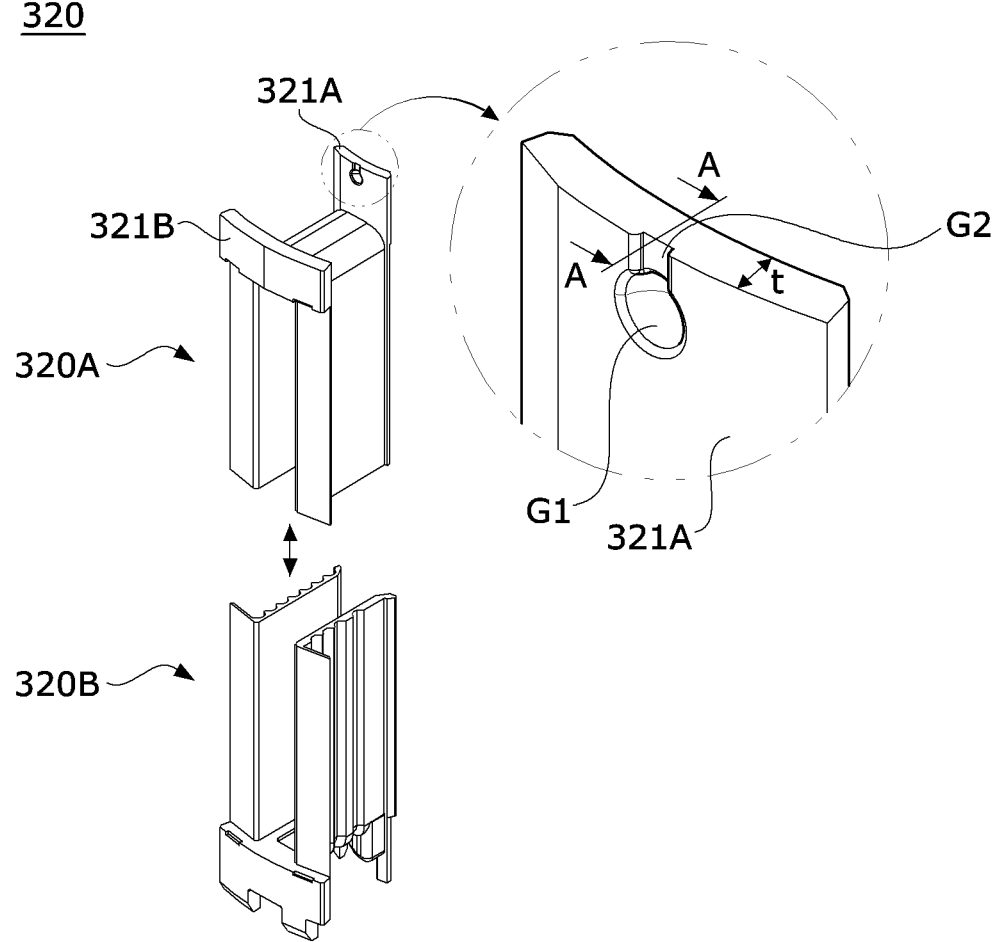
FIG. 3 is a view illustrating an insulator.
Figure 4:
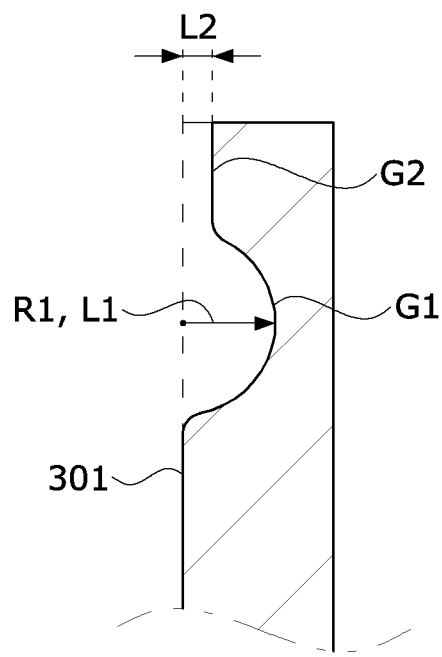
FIG. 4 is a cross-sectional view illustrating an inner guide of the insulator along line A-A of FIG. 3.

FIG. 2 is a perspective view illustrating the busbar holder 500 and the stator 300, FIG. 3 is a view illustrating the insulator 320, and FIG. 4 is a cross-sectional view illustrating an inner guide of the insulator 320 along line A-A of FIG. 3.

Referring to FIGS. 2 and 3, the busbar holder 500 is disposed above the stator 300. The busbar holder 500 may be fixed to the insulator 320. When the busbar holder 500 is fixed to the insulator 320, in a state in which the busbar holder 500 and the insulator 320 overlap in a radial direction, a contact surface is formed as a spherical surface, the busbar holder 500 and the insulator 320 are mutually restricted in all directions such as an axial direction, a circumferential direction, and the radial direction, and thus there is an advantage of significantly reducing a gap generated between the busbar holder 500 and the insulator 320.

A structure of the insulator 320 and the busbar holder 500 for forming the contact surface of the busbar holder 500 and the insulator 320 into the spherical surface is as follows.

Referring to FIGS. 3 and 4, the insulator 320 includes a first groove G1 and a second groove G2, and the second groove G2 includes a first spherical surface S1 that is concave. The first groove G1 is for guiding entry of a protrusion 511 of the busbar holder 500, and the second groove G2 is for fixing the busbar holder 500 and the insulator 320 by being coupled to the protrusion 511. The first groove G1 and the second groove G2 are connected. The first groove G1 and the second groove G2 may be concavely formed in a guide 321A or 321B of the insulator 320. For example, the first groove G1 and the second groove G2 may be concavely formed in an outer surface of an inner guide 321A of the insulator 320.

The second groove G2 may be disposed to be spaced apart from an edge of the inner guide 321A, and the first groove G1 may be connected to the second groove G2 from the edge of the inner guide 321A. The first groove G1 and the second groove G2 may be disposed at the middle of a circumferential width of the inner guide 321A.

The first groove G1 and the second groove G2 are illustrated as being disposed in the inner guide 321A but are not limited thereto, and the first groove G1 and the second groove G2 may be disposed in an inner surface of an outer guide 321B of the insulator 320.

The insulator 320 may include an upper insulator 320A and a lower insulator 320B. The upper insulator 320A may be coupled to one side of the stator core 310, and the lower insulator 320B may be coupled to the other side of the stator core 310. The first groove G1 and the second groove G2 may be disposed in only the upper insulator 320A close to the busbar holder 500. Accordingly, a shape of the upper insulator 320A and a shape of the lower insulator 320B may be different. Meanwhile, when the busbar 400 is disposed close to the lower insulator 320B, the first groove G1 and the second groove G2 may be disposed in only the lower insulator 320B.

In addition, the first groove G1 and the second groove G2 may also be disposed in the lower insulator 320B as well as in the upper insulator 320A, and in this case, a shape of the upper insulator 320A and a shape of the lower insulator 320B may be the same.

Figure 5:
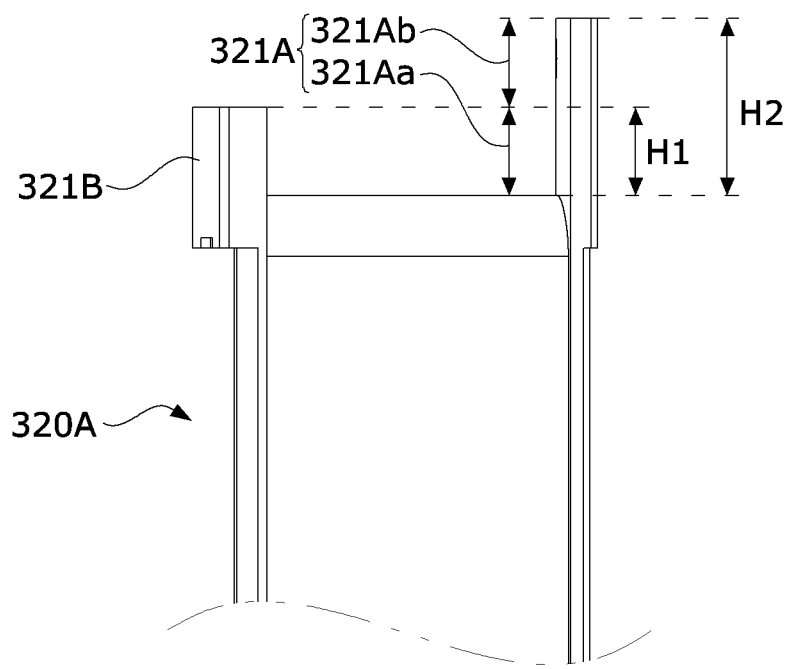
FIG. 5 is a side view illustrating the insulator.
Figure 6:
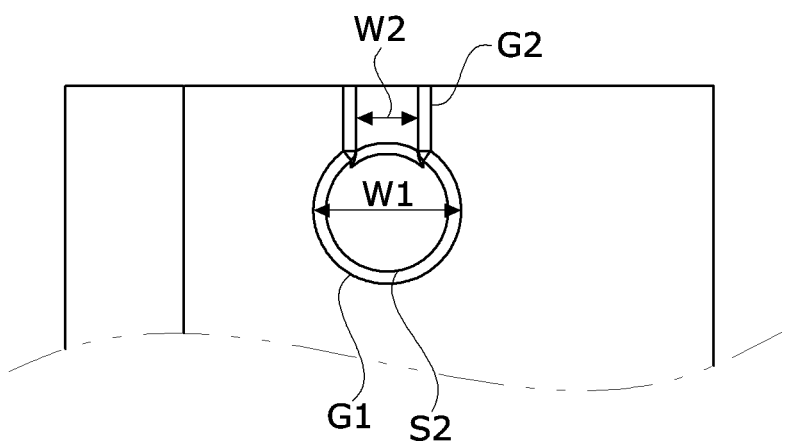
FIG. 6 is a view illustrating a size of a first groove and a size of a second groove.

FIG. 5 is a side view illustrating the insulator 320, and FIG. 6 is a view illustrating a size of the first groove G1 and a size of the second groove G2.

Referring to FIGS. 4 to 6, an axial length H2 of the inner guide 321A may be greater than an axial length H1 of the outer guide 321B. The inner guide 321A may be divided into a first part 321Aa corresponding to the outer guide 321B and a second part 321Ab extending to the first part 321Aa in the axial direction. At least a part of the second part 321Ab may be disposed to overlap an extension 510 of the busbar holder 500 in the radial direction. The second part 321Ab may include a first surface 301 in contact with the busbar holder 500, and the first groove G1 and the second groove G2 may be disposed in the first surface 301.

Meanwhile, a radius R1 of the first spherical surface S1 may be smaller than a radial maximum thickness t of the inner guide 321A. For example, when the radial maximum thickness t of the inner guide 321A is 1.5 mm, the radius R1 of the first spherical surface S1 may be 1 mm. In addition, a circumferential maximum length W1 of the first groove G1 may also be smaller than the radial maximum thickness t of the inner guide 321A.

The circumferential maximum length W1 of the first groove G1 may be greater than a circumferential maximum length W2 of the second groove G2. In addition, a radial maximum length L1 of the first groove G1 may be greater than a radial maximum length L2 of the second groove G2. In this case, the radial maximum length L1 of the first groove G1 may be the same as the radius R1 of the first spherical surface S1. Due to such a difference, the protrusion 511 of the extension 510 disposed in the first groove G1 can be completely prevented from escaping from the first groove G1 in the axial direction.

Figure 7:
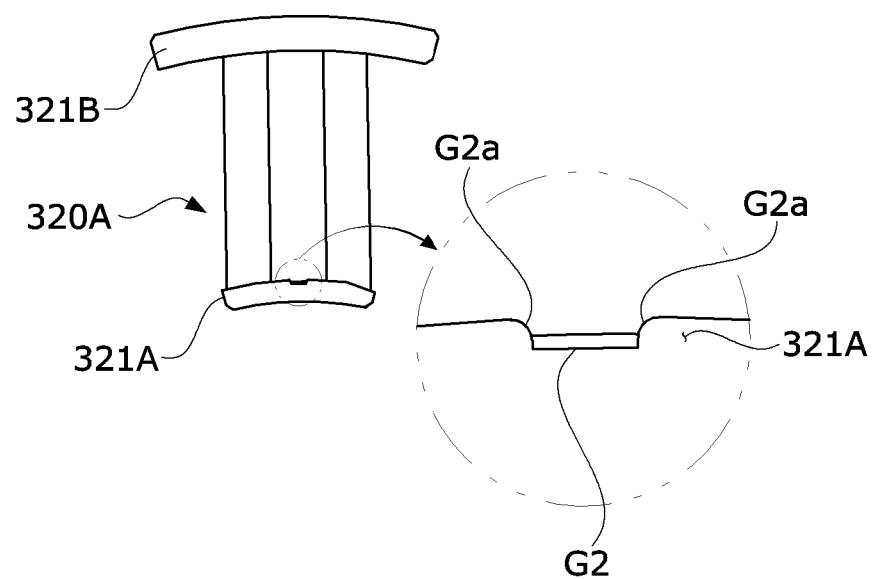
FIG. 7 is a plan view illustrating the second groove of the insulator.

FIG. 7 is a plan view illustrating the second groove G2 of the insulator 320.

Referring to FIG. 7, corners G2a of both side walls of the second groove G2 may be formed in a round shape. In a process of fixing the busbar holder 500 to the insulator 320, the protrusion 511 of the busbar holder 500 moves to the first groove G1 along the second groove G2, and the round-shaped corners G2a have an advantage of guiding the protrusion 511 to be smoothly inserted into the second groove G2. In consideration of a hemispherical shape of the protrusion 511, the round-shaped corners G2a are an advantageous structure for guiding the protrusion 511.

Figure 8:
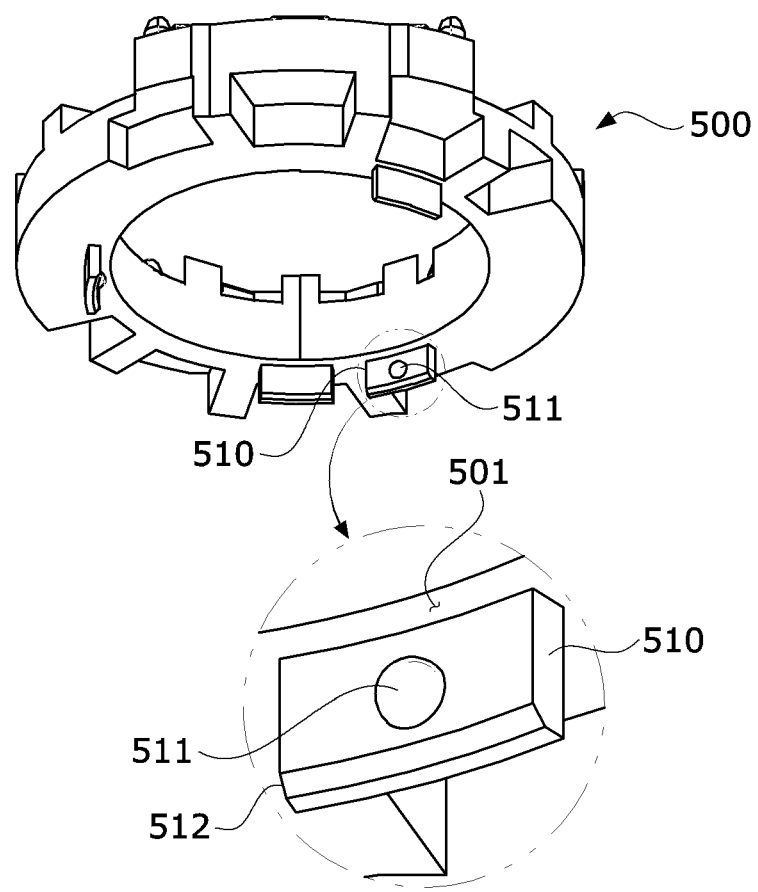
FIG. 8 is a view illustrating the busbar holder.
Figure 9:
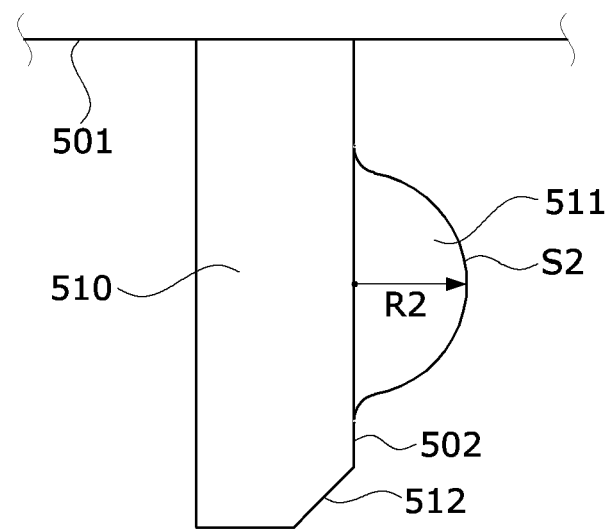
FIG. 9 is a view illustrating an extension and a protrusion of the insulator illustrated in FIG. 8.

FIG. 8 is a view illustrating the busbar holder 500, and FIG. 9 is a view illustrating the extension 510 and the protrusion 511 of the insulator 320 illustrated in FIG. 8.

Referring to FIGS. 8 and 9, the busbar holder 500 may include the extension 510 and the protrusion 511. The extension 510 is disposed to protrude from a lower surface 501 of the busbar holder 500. The extension 510 includes a second surface 502 in contact with the first surface 301 of the insulator 320. In addition, the protrusion 511 is disposed to protrude from the second surface 502 in the radial direction. The protrusion 511 includes a convex second spherical surface S2. The protrusion 511 may be disposed at the middle of a circumferential width of the extension 510. The protrusion 511 is disposed in the first groove G1 to form a contact region having a curved shape with the first groove G1, and thus the busbar holder 500 and the insulator 320 are mutually and fixedly restricted in all directions such as the axial direction, the circumferential direction, and the radial direction.

A chamfer portion 512 may be disposed around a corner formed by the second surface 502 and a lower surface of the extension 510. When the extension 510 and the inner guide 321A overlap so that the first surface 301 and the second surface 502 are in contact with each other, the chamfer portion 512 guides the extension 510 to smoothly move along the inner guide 321A.

Figure 10:
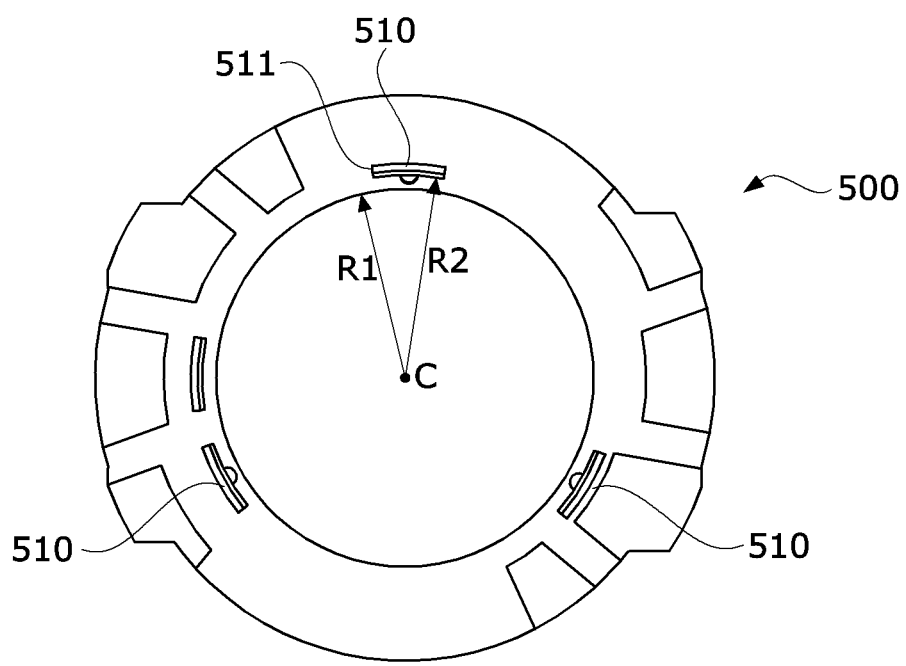
FIG. 10 is a view illustrating a lower surface of the busbar holder illustrated in FIG. 8.

FIG. 10 is a view illustrating a lower surface of the busbar holder 500 illustrated in FIG. 8.

Referring to FIG. 10, a plurality of extensions 510 may be disposed at predetermined intervals in the circumferential direction around a center C of the busbar holder 500. On the basis of the circumferential direction, the extensions 510 may be disposed at equal intervals. A radius R2 of the extension 510 from the center C of the busbar holder 500 may be greater than a radius R1 of an inner circumferential surface of the busbar holder 500. In consideration of a position of the protrusion 511 and a position of the inner guide 321A of the insulator 320, the extension 510 may be positioned further outward than the inner circumferential surface of the busbar holder 500.

Figure 11:
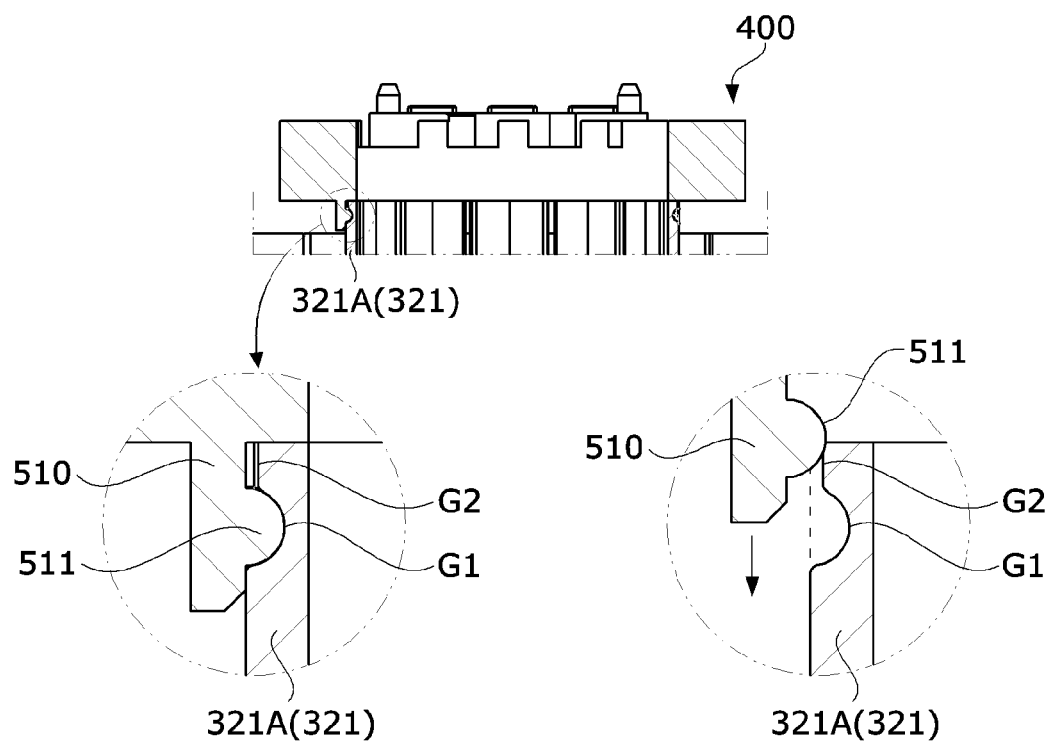
FIG. 11 is a view illustrating a process in which the busbar holder is fixed to the insulator.

FIG. 11 is a view illustrating a process in which the busbar holder 500 is fixed to the insulator 320.

Referring to FIG. 11, when the busbar holder 500 is moved downward from an upper side of the insulator 320, the protrusion 511 comes into contact with the second groove G2 and is guided to the first groove G1. Since the protrusion 511 is guided by the second groove G2, even when assembly directions of the busbar holder 500 and the insulator 320 are slightly misaligned, the assembly directions can be naturally adjusted and aligned. In this case, the extension 510 may be disposed outside the inner guide 321A, and the extension 510 may be in a state of being pushed by the second groove G2 and elastically deformed outward.

When the protrusion 511 is moved along the second groove G2 and positioned in the first groove G1, the extension 510 and the inner guide 321A are disposed to overlap in the radial direction, the protrusion 511 and the second groove G2 are engaged with each other, and thus the busbar holder 500 is fixed to the insulator 320. Since a contact region of the protrusion 511 and the second groove G2 forms a spherical surface, a stable fixing force is secured without any gap in all directions such as the axial direction, the circumferential direction, and the radial direction.

Figure 12:
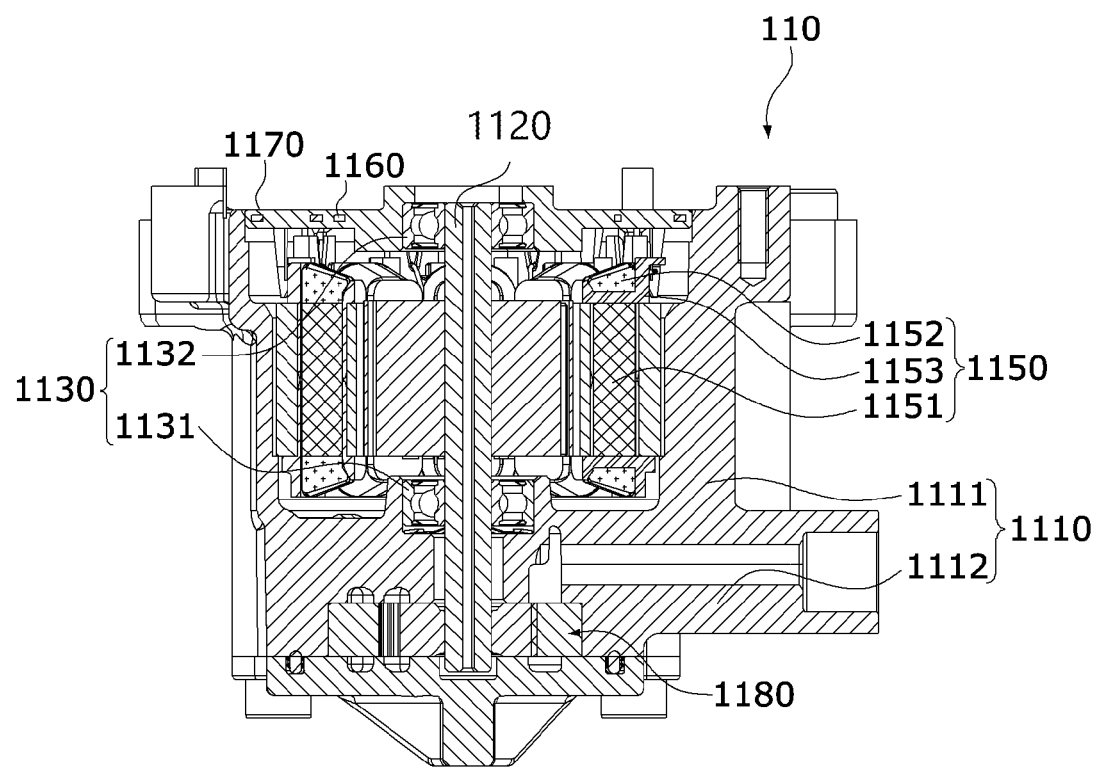
FIG. 12 is a cross-sectional view illustrating a motor according to another embodiment.

FIG. 12 is a cross-sectional view illustrating a motor according to another embodiment.

Referring to FIG. 12, a motor 110 may include a housing 1110, a shaft 1120, bearings 1130, a rotor 1140, a stator 1150, a busbar 1160, a busbar holder 1170, and a gear part 1180.

The housing 1110 may form an exterior of the motor 110. The housing 1110 may include a motor housing 1111 and a pump housing 1112. The motor housing 1111 may accommodate the rotor 1140, the stator 1150, the busbar 1160, and the busbar holder 1170 therein. In addition, the pump housing 1112 may accommodate the gear part 1180 therein.

The shaft 1120 may be disposed inside the motor housing 1111 and the pump housing 1112. In the housing 1110, a hole may be formed in the motor housing 1111 and the pump housing 1112. The shaft 1120 may pass through the hole. The hole may have a shape corresponding to a diameter of the shaft 1120.

The bearings 1130 may rotatably support the shaft 1120. The bearings 1130 may include a first bearing 1131 and a second bearing 1132. The first bearing 1131 and the second bearing 1132 may be spaced apart from each other with the stator 1150 interposed therebetween in an axial direction. The first bearing 1131 may be disposed in the housing 1110. In addition, the second bearing 1132 may be disposed in the busbar holder 1170. In this case, a wave washer W may be disposed between the first bearing 1131 and the housing 1110. In the wave washer W, a stress may be generated in the axial direction.

The rotor 1140 is coupled to the shaft 1120. The rotor 1140 rotates due to an electrical interaction with the stator 1150. The rotor 1140 may be disposed to correspond to the stator 1150 and may be disposed inside the stator 1150.

The stator 1150 is disposed to correspond to the rotor 1140. In addition, the stator 1150 may be fixed to the housing 1110. The stator 1150 may include a stator core 1151, a coil 1152, and an insulator 1153 mounted on the stator core 1151. The coil 1152 may be wound around the insulator 1153. The insulator 1153 is disposed between the coil 1152 and the stator core 1151. The coil 1152 induces an electrical interaction with the magnet of the rotor 1140.

The busbar 1160 may be electrically connected to the coil of the stator 1150. The busbar 1160 may be electrically connected to power terminals (not shown) of a U-phase, a V-phase, and a W-phase. The busbar holder 1170 may be disposed above the stator 1150. The busbar holder 1170 may be an annular mold member.

The gear part 1180 may be coupled to the shaft 1120. The gear part 1180 may include an internal gear and an external gear. In this case, the internal gear may be coupled to the shaft 1120 and rotate. The internal gear may have a predetermined eccentric structure. Due to such eccentricity, a space through which a fluid fuel flows between the inner gear and the outer gear is generated. Accordingly, during a rotational movement, a volume increase portion suctions a surrounding fluid due to a decrease in pressure, and a volume decrease portion discharges a fluid due to an increase in pressure. Any known gear structure may be applied to the structure of the gear part, and a further detailed description will be omitted.

Figure 13:
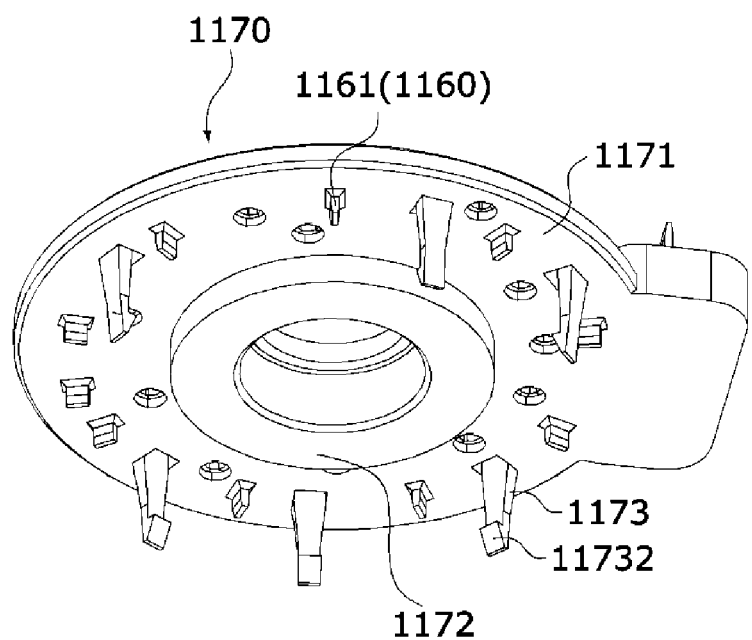
FIG. 13 is a perspective view illustrating a busbar and a busbar holder.

FIG. 13 is a perspective view illustrating the busbar and the busbar holder.

Referring to FIG. 13, the busbar 1160 and the busbar holder 1170 may be integrally formed. The busbar holder 1170 may include a first part 1171, a second part 1172, and a third part 1173.

The first part 1171 may be an annular member. The busbar 1160 may be disposed on the first part 1171. The first part 1171 may be spaced apart from the stator 1150 in the axial direction. The first part 1171 may be coupled to the housing 1110. Accordingly, the busbar holder 1170 may cover an upper portion of the housing 1110.

The second part 1172 may be disposed in a center of the first part 1171. The second part 1172 may form a bearing pocket portion 1172P in which the bearing 1130 is disposed. An outer circumferential surface of the bearing 1130 may come into contact with the second part 1172.

The third part 1173 may extend from the first part 1171 toward the stator 1150. An end portion of the third part 1173 may be disposed closer to the stator 1150 than cross sections of the first part 1171 and the second part 1172 are. In addition, the third part 1173 may include a protrusion 11732. The protrusion 11732 may be disposed on the end portion of the third part 1173. The protrusion 11732 may protrude in a radial direction. In this case, the protrusion 11732 may be fixedly hooked on to the insulator 1153.

The busbar 1160 may be provided as a plurality of busbars 1160. In addition, each of the plurality of busbars 1160 may include a first end portion 1161. The first end portion 1161 may be exposed from the first part 1171. In addition, the first end portion 1161 may be connected to a first terminal T which will be described below.

Figure 14:
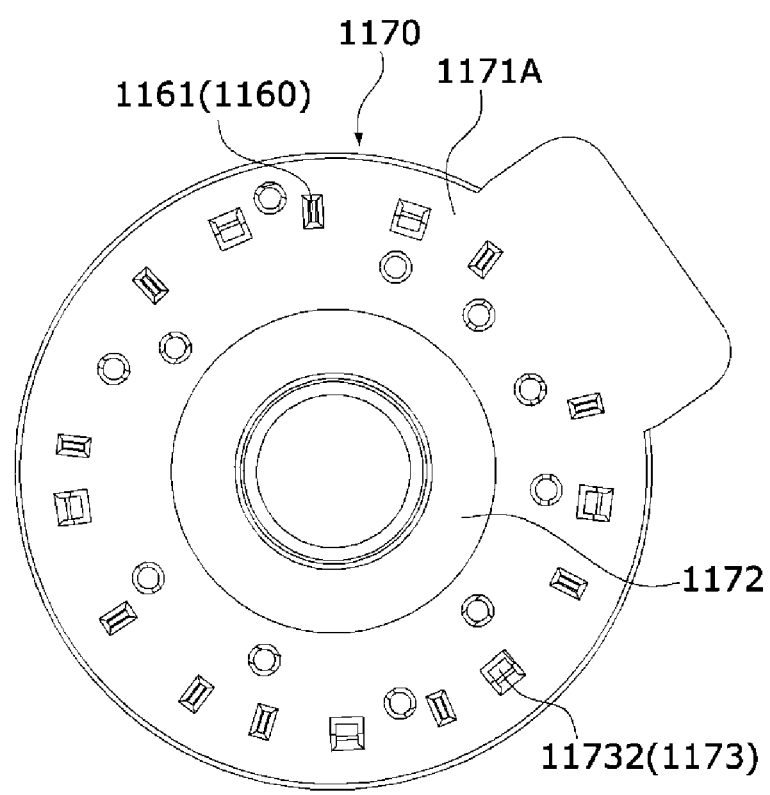
FIG. 14 is a bottom view illustrating the busbar and the busbar holder.

FIG. 14 is a bottom view illustrating the busbar and the busbar holder.

Referring to FIG. 14, a lower surface 1171A of the first part 1171 faces the stator 1150. In this case, the third part 1173 may be disposed on the lower surface 1171A of the first part 1171. The third part 1173 may be provided as a plurality of third parts 1173. The number of the third parts 1173 may be six. In this case, the plurality of third parts 1173 may be disposed to be spaced apart from each other in a circumferential direction with respect to an axial center. The first part 1171 may include a plurality of holes 1171A formed inward from the third parts 1173. In addition, the third parts 1173 may include a 3A part 1173A and a 3B part 1173B. The 3A part 1173A and the 3B part 1173B may be spaced a predetermined distance from each other in the circumferential direction.

The first end portion 1161 protrudes from the lower surface 1171A of the first part 1171. The first end portion 1161 may be provided as a plurality of first end portions 1161. In addition, at least one first end portion 1161 may be disposed between the 3A part 1173A and the 3B part 1173B. The plurality of first end portions 1161 may be disposed to be spaced apart from each other in the circumferential direction with respect to the axial center.

Figure 15:
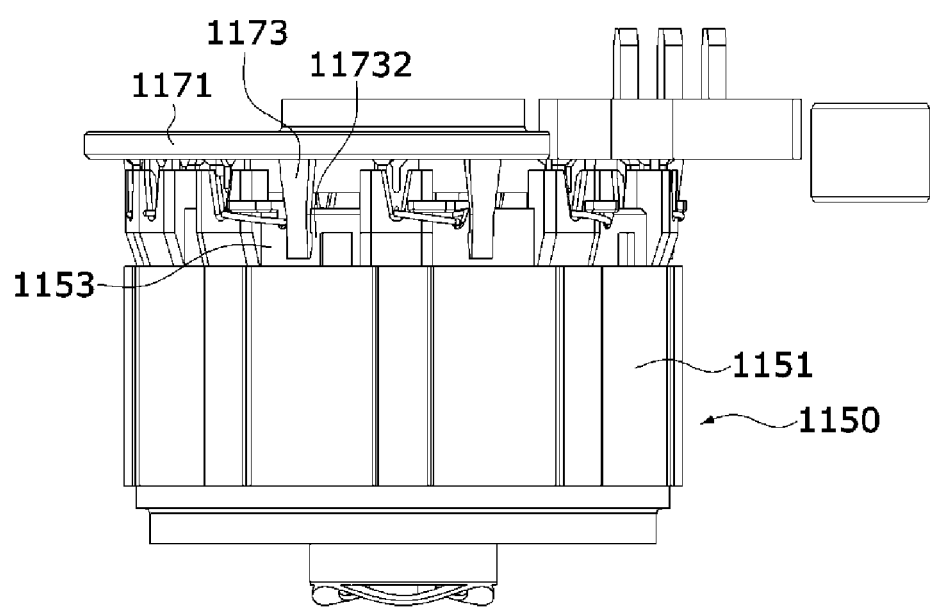
FIG. 15 is a side view illustrating a stator, the busbar, and the busbar holder.

FIG. 15 is a side view illustrating the stator, the busbar, and the busbar holder.

Referring to FIG. 15, the busbar holder 1170 may be disposed to be coupled to the stator 1150. In this case, the first part 1171 may be disposed above the stator 1150. The first part 1171 may be spaced apart from an upper end of the stator 1150. In addition, the third part 1173 may extend downward from the first part 1171. In addition, the protrusion 1732 of the third part 1173 may be fastened to the insulator 1153. In this case, the insulator 1153 may include a stepped portion to which the protrusion 1732 is fastened.

Figure 16:
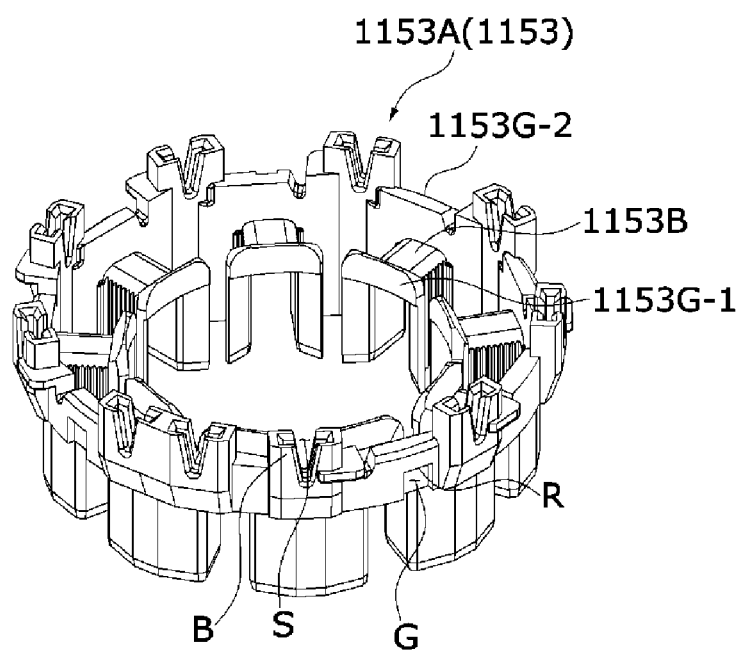
FIG. 16 is a perspective view illustrating an upper insulator.

FIG. 16 is a perspective view illustrating an upper insulator.

Referring to FIG. 16, the insulator 1153 may include an upper insulator 1153A disposed on the stator core 1151. Referring to FIG. 16, the upper insulator 1153A may include an inner guide 1153G1, a body 1153B, and an outer guide 1153G2.

The coil may be wound around the body 1153B. The body 1153B may be disposed on the stator core 1151 to insulate the stator core 1151 from the coil 1152. The inner guide 1153G1 supports the coil 1152 wound around the body 1153B to prevent the coil 1152 from being separated inward. In addition, the outer guide 1153G2 supports the coil 1152 wound around the body 1153B to prevent the coil 1152 from being separated outward.

A plurality of grooves G are formed in an outer circumference surface of the outer guide 1153G2. In this case, the grooves G may be disposed above the stator core 1151. The protrusion 11732 is disposed in each of the grooves G. In addition, the outer guide 1153G2 includes a stepped portion R disposed at an upper side of the groove G. The stepped portion R is in contact with the protrusion 11732. In this case, the protrusion 11732 may be fixedly hooked on the stepped portion R. The groove G and the stepped portion R are provided as the plurality of grooves G and a plurality of stepped portions R, respectively. The number of grooves G and the number of stepped portions R may be the same as the number of third parts 1173. The plurality of grooves G and the plurality of stepped portions R may be disposed to be spaced apart from each other in the circumferential direction with respect to the axial center. A width of the groove G may be greater than a width of the protrusion 11732.

The outer guide 1153G2 may include a slot S disposed to face upward. In addition, the outer guide 1153G2 may include a boss B surrounding the slot S. A first terminal 1190, which will be described below, may be disposed in the slot S. In this case, the boss B may guide the first terminal 1190 to be inserted into the slot S. The slot S and the boss B may be provided as a plurality of slots S and a plurality of bosses B, respectively. In addition, the plurality of slots S and the plurality of bosses B may be spaced apart from each other in the circumferential direction with respect to the axial center. At least one slot S and at least one boss B may be disposed between the plurality of grooves G.

Figure 18:
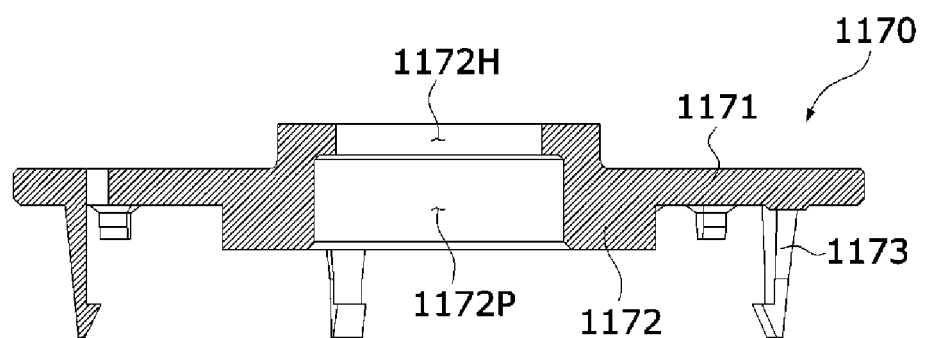
FIG. 18 is a cross-sectional view illustrating the busbar holder.

FIG. 18 is a view illustrating a portion in which the coil, the first terminal, and the busbar are connected.

Referring to FIG. 18, the motor 110 may further include the first terminal 1190 disposed between the stator 1150 and the busbar 1160. The first terminal 1190 may be electrically connected to the coil 1151. In addition, the first terminal 1190 may include a first groove 1191. The coil 1151 may be press-fitted into the first groove 1191. In this case, the first terminal 1190 may fixedly press the coil 1151 extending upward from the stator 1150. In this case, the first terminal 1190 may be a mag-mate terminal. The first terminal 1190 may be disposed in the slot S. In this case, a gap may be formed between the boss B and the first terminal 1190.

The first end portion 1161 may be electrically connected to the coil 1152 through the first terminal 1190. The first end portion 1161 may be in contact with the first terminal 1190. In this case, the first end portion 1161 may be disposed in the gap formed between the boss B and the first terminal 1190.

Figure 17:
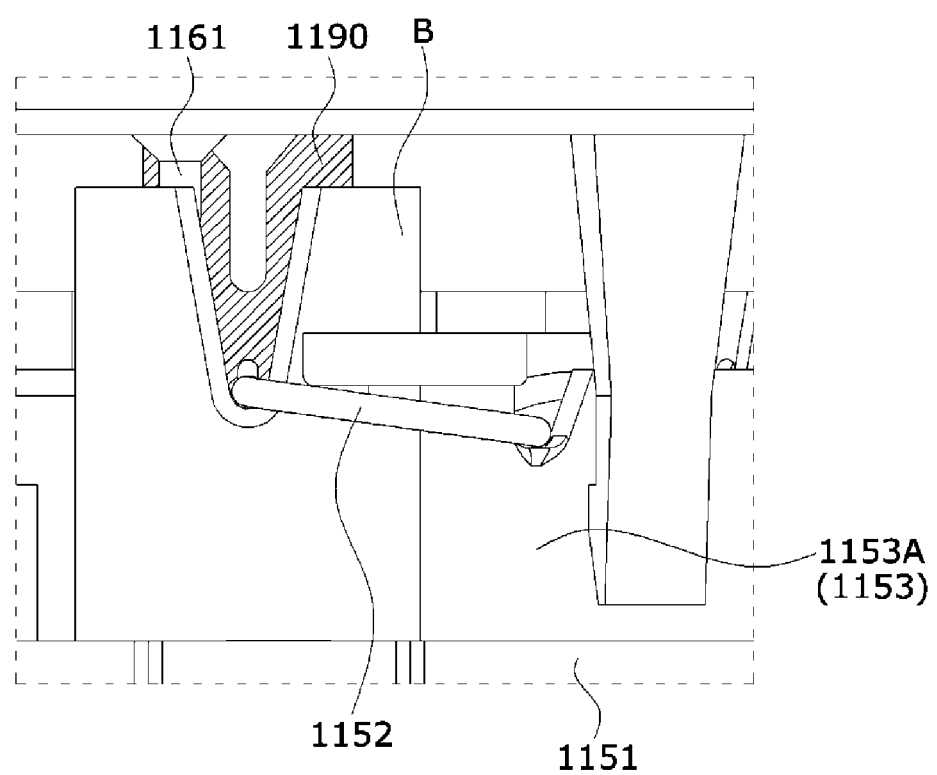
FIG. 17 is a view illustrating a portion in which a coil, a first terminal, and the busbar are connected.

FIG. 17 is a view illustrating a portion in which the coil, the first terminal, and the busbar are connected.

Referring to FIG. 18, the motor 110 may further include the first terminal 1190 disposed between the stator 1150 and the busbar 1160. The first terminal 1190 may be electrically connected to the coil 1151. In addition, the first terminal 1190 may include a first groove 1191. The coil 1152 may be press-fitted into the first groove 1191. In this case, the first terminal 1190 may fixedly press the coil 1152 extending upward from the stator 1150. In this case, the first terminal 1190 may be a mag-mate terminal. The first terminal 1190 may be disposed in the slot S. In this case, a gap may be formed between the boss B and the first terminal 1190.

The bearing pocket portion 1172P may be formed in the second part 1172. The bearing 1130 is disposed in the bearing pocket portion 1172P. In addition, a through hole 1172H connected to the bearing pocket portion 1172P may be formed in the second part 1172. In this case, the second part 1172 may support the bearing 1130 in the radial direction and the axial direction.

Figure 19:
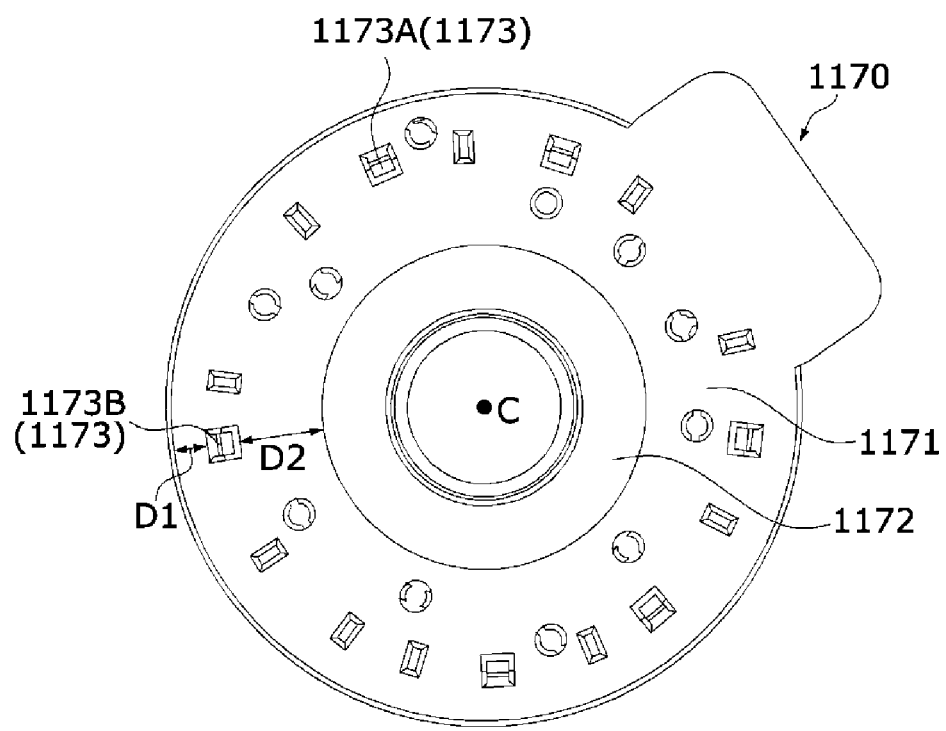
FIG. 19 is a bottom view illustrating the busbar holder.

FIG. 19 is a bottom view illustrating the busbar holder.

Referring to FIG. 19, the plurality of third parts 1173 may be disposed on the same circumferential line with respect to an axial center C. In this case, a distance from the axis center C to the 3A part 1173A and a distance from the axial center C to the 3B part 1173B are the same. The third part 1173 may be disposed to be spaced a first distance D1 from an outer edge of the first part 1171. In addition, the third part 1173 may be disposed to be spaced a second distance D2 from the second part 1172. In this case, the second distance D2 may be greater than the first distance D1.

Figure 20:
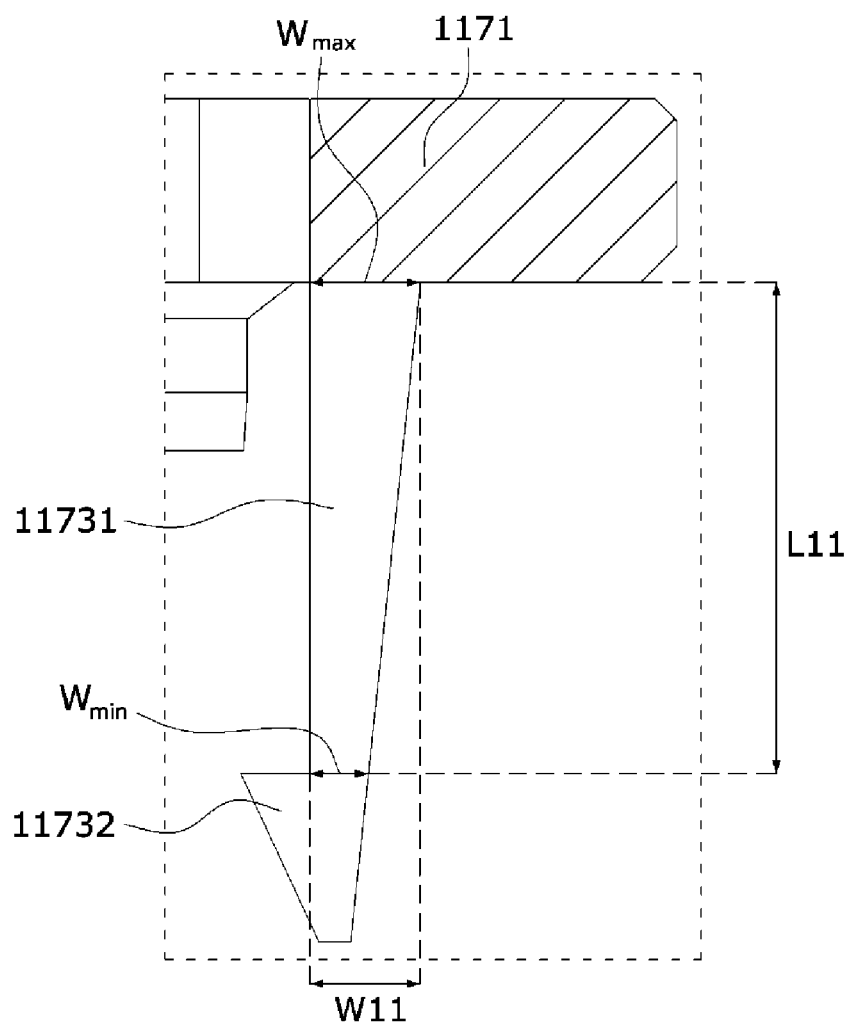
FIGS. 20 and 21 are views illustrating a third part.
Figure 21:
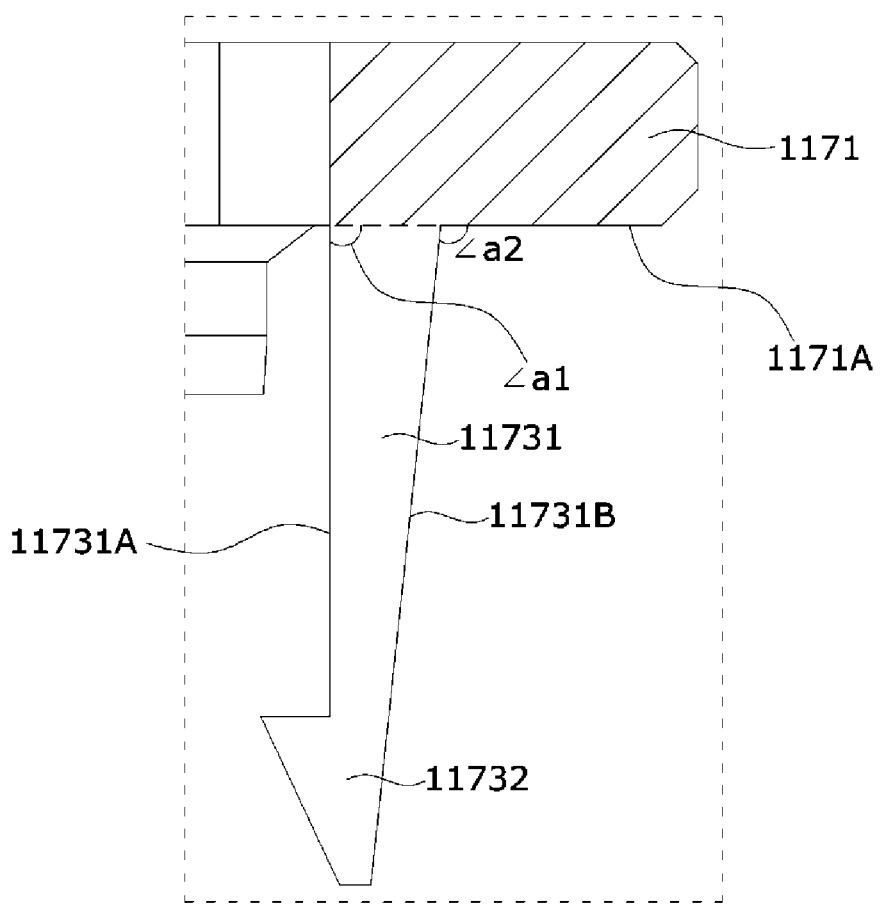

FIGS. 20 and 21 are views illustrating the third part.

Referring to FIG. 20, the third part 1173 may include a leg portion 11731 and the protrusion 11732.

The leg portion 11731 may extend from the first part 1171. The leg portion 11731 connects the first part 1171 and the protrusion 11732. A length L1 of the leg portion 11731 may be greater than an axial distance between the first part 1171 and the insulator 1153. In this case, the leg portion 11731 may have a first width W1$i$ in the radial direction. In addition, in the leg portion 11731, the first width W11 may decrease toward the protrusion 11732. The leg portion may have a maximum width $W_{max}$ and a minimum width $W_{min}$ in the radial direction. A portion having the maximum $W_{max}$ of the leg portion 11731 may be a portion connected to the first part 1171. In addition, a portion of the minimum width $W_{min}$ of the leg portion 11731 may be a portion connected to the protrusion 11732. In this case, a ratio of the minimum width $W_{min}$ to the maximum width $W_{max}$ may be in the range of 0.4 to 0.6.

Referring to FIG. 21, the leg portion 11731 may include a first surface 1731A and a second surface 1731B. The first surface 1731A and the second surface 1731B extend from the lower surface of the first part 1171. In this case, the first surface 1731A is disposed to face inward. In addition, the second surface 1731B is disposed to face outward. The first surface 1731A or the second surface 1731B of the leg portion may be disposed to be inclined with respect to the lower surface of the first part 1171. In this case, the first surface 1731A may be disposed to form a first angle $\angle a1$ with respect to the lower surface of the first part 1171. In addition, the second surface 1731B may form a second angle $\angle a2$ with respect to the lower surface of the first part 1171. In addition, the first angle $\angle a1$ and the second angle $\angle a2$ may be different. The first angle $\angle a1$ may be in the range of 87 to 92 degrees. Meanwhile, the second angle $\angle a2$ may be in the range of 93 to 100 degrees.

Figure 22:
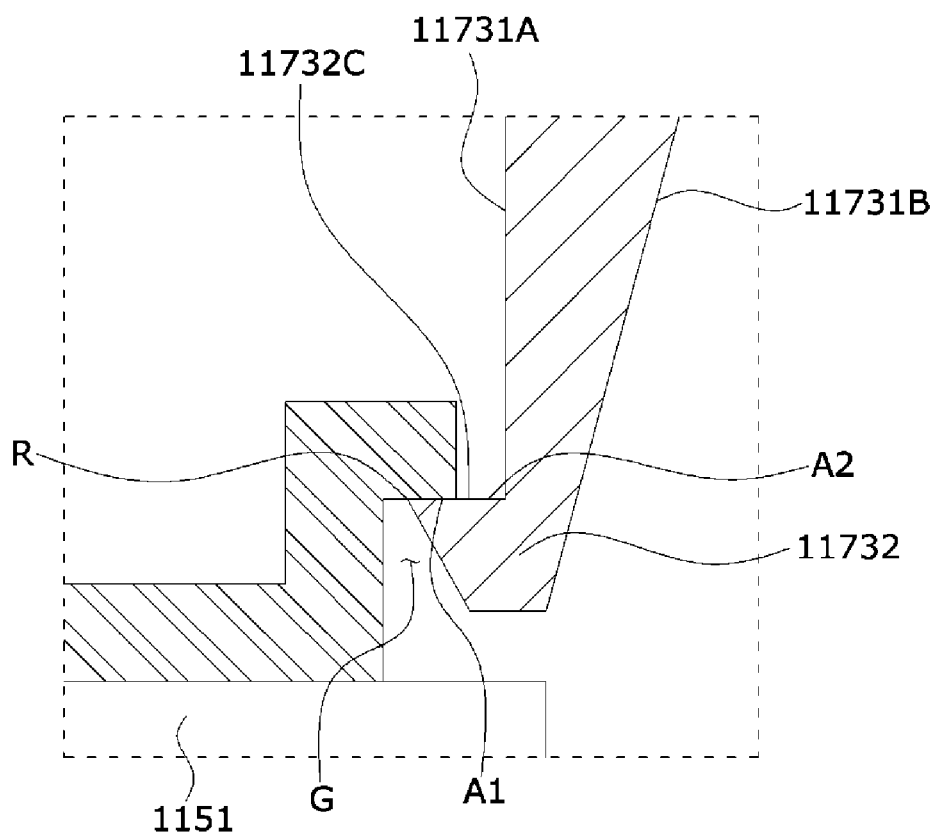
FIG. 22 is a view illustrating a portion in which an outer guide is in contact with the third part.

FIG. 22 is a view illustrating a portion in which the outer guide and the third part are in contact with each other.

Referring to FIG. 22, the protrusion 11732 may extend from an end portion of the leg portion 11731. The protrusion 11732 may include a third surface 1732C in contact with the stepped portion R.

The third surface 1732C may be connected to the first surface 1731A. In this case, the first surface 1731A may be spaced apart from the outer guide 1153G2. In addition, only a part of the protrusion 11732 may be disposed in the groove G. Accordingly, a part of the third surface 1732C may not be in contact with the stepped portion R. The third surface 1732C may include a first region A1 with which the stepped portion R is in contact and a second region A2 which is the remaining region of the third surface 1732C. An area of the second region A2 may be greater than an area of the first region A1. In addition, an axial length L2 of the protrusion 11732 may be smaller than an axial length of the groove G. Accordingly, an end portion of the protrusion 11732 may be spaced apart from an upper surface of the stator core 1151.

Such a motor has a structure in which the busbar holder and the insulator are fixedly fastened to each other, and a fixing force between the stator and the busbar can be increased to prevent a bad connection between the stator and the busbar due to axial vibrations. In particular, a phenomenon in which the conventional busbar is completely separated from the stator can be prevented by generating a stress of the wave washer supporting the bearing in the axial direction.

In the above embodiments, an example of an inner rotor type motor has been described, but the present invention is not limited thereto. The present invention can also be applied to an outer rotor type motor. In addition, the present invention can be used in various devices such as vehicles or home appliances.

The invention claimed is:

1. A motor comprising:
a shaft;
a rotor coupled to the shaft; and
a stator disposed to correspond to the rotor,
wherein the stator includes a stator core, an insulator coupled to the stator core, and a coil disposed on the insulator,
the coil is electrically connected to a busbar,
the busbar is supported by a busbar holder,
the insulator includes a guide including a first surface,
the busbar holder includes an extension including a second surface in contact with the first surface,
the guide includes a first groove disposed in the first surface,
the extension includes a protrusion disposed on the second surface, and
the protrusion and the first groove form a contact region having a curved shape,
wherein the guide includes a second groove edge of the guide and the first groove,
wherein the first groove and the second groove are connected,
wherein a circumferential maximum length of the first groove is greater than a circumferential maximum length of the second groove.

2. The motor of claim 1, wherein:
wherein the circumferential maximum length of the first groove is smaller than a radial thickness of the guide.

3. The motor of claim 1, wherein:
the extension is a chamfer portion disposed at a lower portion of the extension.

4. The motor of claim 1, wherein
the first groove and the second groove are concavely formed in an outer surface of an inner guide of the insulator.

5. The motor of claim 4, wherein
the first groove and the second groove are disposed at the middle of a circumferential width of the inner guide.

6. A motor comprising:
a shaft;
a rotor coupled to the shaft;
a stator disposed to correspond to the rotor; and
a bearing which supports the shaft,
wherein the stator includes a stator core, an insulator coupled to the stator core, and a coil disposed on the insulator,
the coil is electrically connected to a busbar,
the busbar is supported by a busbar holder,
the busbar holder includes a first part in which the busbar is disposed, a second part which supports the bearing, and at least one third part extending from the first part toward the stator,
the third part includes a protrusion protruding in a radial direction, and
the insulator includes a stepped portion with which the protrusion is in contact,
wherein the third part may include a leg portion which connects the first part and the protrusion, and a radial width of the leg portion decrease toward the protrusion.

7. The motor of claim 6, comprising a housing which accommodates the stator,
wherein the first part is coupled to the housing.

8. The motor of claim 6, wherein:
the second part is disposed further inward than the stator; and
the third part is disposed further outward than the stator.

9. The motor of claim 6, wherein:
the third part is disposed to be spaced a first distance from an outer edge of the first part;
the third part is disposed to be spaced a second distance from the second part; and
the second distance is greater than the first distance.

10. The motor of claim 6, wherein the first part includes at least one hole formed inward from the third part.

* * * * *